US009538015B2

(12) United States Patent
Giesecke

(10) Patent No.: US 9,538,015 B2
(45) Date of Patent: Jan. 3, 2017

(54) METHOD AND APPARATUS FOR IMPROVED BILLING FOR CONVERGED WIRELESS NETWORKS

(75) Inventor: David W. Giesecke, New York, NY (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1465 days.

(21) Appl. No.: 11/618,220

(22) Filed: Dec. 29, 2006

(65) Prior Publication Data
US 2008/0160955 A1    Jul. 3, 2008

(51) Int. Cl.
*H04M 15/00* (2006.01)
*H04W 4/24* (2009.01)

(52) U.S. Cl.
CPC ......... *H04M 15/00* (2013.01); *H04M 15/8083* (2013.01); *H04W 4/24* (2013.01); *H04M 2215/32* (2013.01)

(58) Field of Classification Search
USPC ............ 455/406–409, 435–445; 379/114.03, 379/114.27; 705/14.1–14.32
See application file for complete search history.

(56) References Cited

U.S. PATENT DOCUMENTS

| | | | | |
|---|---|---|---|---|
| 6,275,695 B1* | 8/2001 | Obhan | ................ | H04L 12/2602 455/423 |
| 6,785,535 B2* | 8/2004 | Lucidarme | ............. | H04W 4/24 370/338 |
| 2002/0119766 A1* | 8/2002 | Bianconi | ................. | H04L 12/14 455/406 |
| 2002/0183038 A1* | 12/2002 | Comstock | ............... | H04L 12/14 455/406 |
| 2003/0045267 A1* | 3/2003 | Himmel | ................ | H04M 15/00 455/406 |
| 2003/0139180 A1* | 7/2003 | McIntosh | ............ | H04L 63/0853 455/426.1 |
| 2003/0229595 A1* | 12/2003 | Mononen | ............... | G06Q 20/42 705/63 |
| 2004/0009762 A1* | 1/2004 | Bugiu | .................... | G06Q 30/02 455/406 |
| 2004/0018828 A1* | 1/2004 | Adler | .................... | H04M 15/00 455/405 |

(Continued)

*Primary Examiner* — Matthew Sams
(74) *Attorney, Agent, or Firm* — Tong, Rea, Bentley & Kim, LLC

(57) ABSTRACT

The invention includes a method and apparatus for computing a bill for a wireless subscriber communicating using a converged wireless network. The method includes obtaining service usage information for communications by the wireless subscriber using a wide-area wireless network, obtaining service usage information for communications by the wireless subscriber using a small-area wireless network, and computing a bill value using the wide-area service usage information and the small-area service usage information, and adjusting the bill value using a bill adjustment value that is determined using the small-area service usage information and a bill adjustment parameter. The present invention enables the wireless subscriber to subscribe to a single wireless subscription, track a single set of service credits associated with the service subscription, and receive a single bill for the service subscription, despite different costs of communications by the wireless subscriber using the wide-area and small-area wireless networks.

17 Claims, 4 Drawing Sheets

(56) References Cited

U.S. PATENT DOCUMENTS

| | | | |
|---|---|---|---|
| 2004/0111476 A1* | 6/2004 | Trossen | H04W 4/12 |
| | | | 709/206 |
| 2004/0248547 A1* | 12/2004 | Philsgard | H04L 12/14 |
| | | | 455/405 |
| 2006/0079228 A1* | 4/2006 | Marsico | H04L 63/0892 |
| | | | 455/433 |
| 2007/0032236 A1* | 2/2007 | Kim | H04W 36/365 |
| | | | 455/436 |
| 2008/0019333 A1* | 1/2008 | Kharia | H04W 88/04 |
| | | | 370/338 |
| 2008/0026787 A1* | 1/2008 | Ibrahim | H04W 36/14 |
| | | | 455/552.1 |
| 2008/0160955 A1* | 7/2008 | Giesecke | H04M 15/00 |
| | | | 455/406 |

* cited by examiner

100

200

METHOD AND APPARATUS FOR IMPROVED BILLING FOR CONVERGED WIRELESS NETWORKS

FIELD OF THE INVENTION

The invention relates to the field of communication networks and, more specifically, to converged wireless networks.

BACKGROUND OF THE INVENTION

Wireless service providers continually seek new ways to maximize the capabilities of the current wireless infrastructure in order to improve wireless service. There is a growing effort to integrate capabilities of conventional wide-area wireless networks and newer small-area wireless networks to provide a converged wireless network in which users may use a single dual-mode wireless device, e.g., phone, computer, or personal data assistant, to communicate over both wide-area and small-area wireless networks. The wide-area networks include cellular networks such as Time Division Multiple Access (TDMA) wireless networks, Code Division Multiple Access (CDMA) wireless networks, and various other wide-area wireless networks. The small-area wireless networks include WiFi networks such as Institute of Electrical & Electronics Engineers (IEEE) 802.11a/b/g wireless local area networks (WLANs) and various other small-area wireless networks.

For example, using a converged wireless network, a user may use a dual-mode wireless device to communicate over WiFi networks when the user is at home, at the office, or in a WiFi hotspot, and may use the same dual-mode wireless device to communicate over cellular networks when the user is away from home, the office, and the WiFi hotspot. The trend toward converged wireless networks is primarily driven by two factors. The first factor is the significantly lower cost incurred by a wireless service provide in providing wireless service over a small-area WiFi network versus providing wireless service over a wide-area cellular wireless network. The second factor is increasing demand by users to have a single wireless device which may be used anywhere, irrespective of the type of wireless network available.

Despite the many benefits of converged wireless networks, by enabling communication over different types of wireless networks using one dual-mode wireless device, converged wireless networks result in more complicated service subscription and service billing scenarios. In traditional cellular networks, for example, each user subscribes to wireless service from a wireless service provider. A user typically contracts for a wireless service subscription that is based on a total number of monthly minutes, e.g., 600 peak minutes and 3000 off-peak minutes, e.g., night and weekend minutes, for $50/month. In converged wireless networks, on the other hand, since costs to wireless service providers of providing service over cellular networks and WiFi networks is different, wireless service providers may want to bill customers differently for service provided over cellular networks versus service provided over WiFi networks.

Disadvantageously, the existing approach to wireless service subscription and billing in converged wireless networks requires each user to obtain two wireless service subscriptions, one subscription for communications over cellular networks and another subscription for communications over WiFi networks. As a result, since users typically contract for wireless service subscriptions based on a total number of monthly minutes, existing billing practices for converged wireless networks therefore require users to track two sets of minutes, i.e., cellular minutes and WiFi minutes, as well as receive two separate bills for the two different wireless service subscriptions. This extra tracking of minutes that must be performed by users of converged wireless networks, as well as the additional bill received by the users, may deter the users from switching to converged wireless networks, thereby depriving both wireless service providers and users from various benefits of converged wireless networks.

SUMMARY OF THE INVENTION

The problems of billing in converged wireless networks are overcome by a method and apparatus for determining a single bill for a wireless subscriber communicating using a converged wireless network including wide-area wireless networks and small-area wireless networks controlled by a wireless service provider. The method includes determining a bill value using wide-area service usage information for communications by the wireless subscriber using a wide-area wireless network and small-area service usage information for communications by the wireless subscriber using a small-area wireless network, and adjusting the bill value using a bill adjustment value that is determined using the small-area service usage information and a bill adjustment parameter. The value of the bill adjustment parameter is controlled by the wireless service provider. The value of the bill adjustment parameter may be modified by the wireless service provider in order to modify the bill adjustment value and, thus, the bill value. The bill adjustment value may be a refund credited to the wireless subscriber based on the wireless subscriber's usage of the small-area wireless network. By providing a refund to the wireless subscriber based on the wireless subscriber's usage of the small-area wireless network, the wireless provider can encourage the wireless subscriber to communicate, whenever possible, using the small-area wireless network rather than the wide-area wireless network.

Despite different costs of communicating over wide-area and small-area wireless networks, the present invention advantageously allows the wireless subscriber to maintain one service subscription having one set of associated service credits, rather than requiring the wireless subscriber maintain two separate service subscriptions and track two separate sets of service credits associated with the different service subscriptions. By enabling a wireless subscriber to maintain a single service subscription and track a single associated set of service credits, the present invention enables the wireless subscriber to receive a single bill for communications over the converged wireless network, rather than receiving separate bills for communications over the wide-area and small-area wireless networks, thereby providing operational savings to the wireless service provider and simplifying the wireless service subscription and billing experience for the wireless subscriber.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention supports service registration and billing functions for a converged wireless network including a wide-area wireless network(s) and a small-area wireless network(s). A wide-area wireless network may include any wireless network for which associated wireless traffic is transported using a radio access network. A wide-area wireless network may include a cellular-based wireless network, such as Time Division Multiple Access (TDMA) wireless networks, Code Division Multiple Access (CDMA) wireless networks, and various other wide-area wireless networks. A small-area wireless network may include any wireless network for which associated wireless traffic is transported using a wireless access network. A small-area wireless network may include a WiFi-based wireless network, such as Institute of Electrical & Electronics Engineers (IEEE) 802.11a/b/g wireless local area networks (WLANs) and various other small-area wireless networks The present invention enables a single wireless service subscription to be offered to a wireless subscriber communicating over a converged wireless network. The present invention further enables a single wireless service bill to be computed for the wireless subscriber for communications over the converged wireless network. The single wireless service subscription and associated single bill simplifies subscription and billing management for the wireless subscriber, enabling the wireless subscriber to track a single set of service credits (e.g., voice minutes, data bandwidth, and the like), and receive a single bill, for communications by the wireless subscriber over the converged wireless network (despite different billing by the wireless service provider of communications by the wireless subscriber over the wide-area wireless network(s) and communications by the wireless subscriber over the small-area wireless network(s)).

Figure 1:
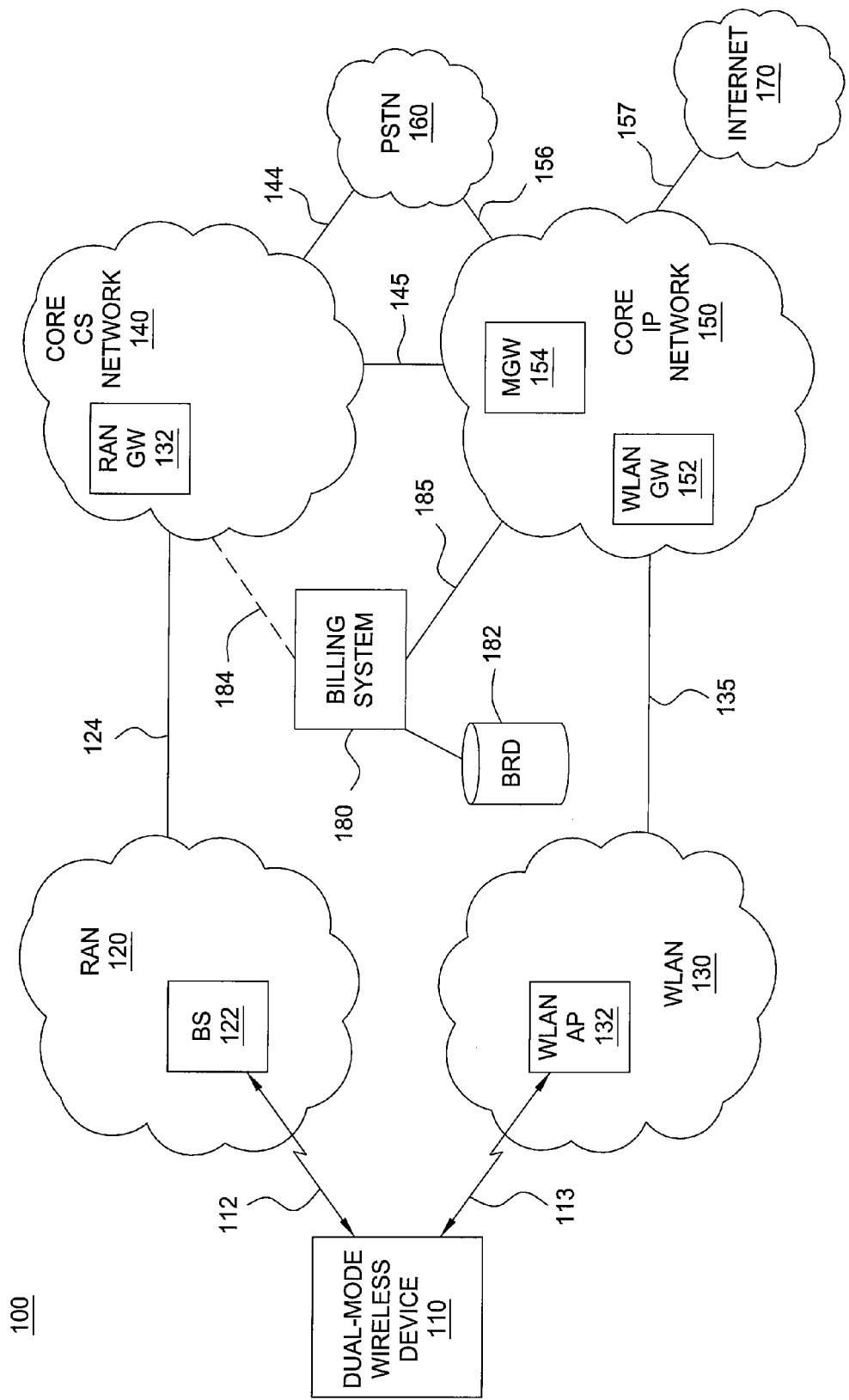
FIG. 1 depicts a high-level block diagram of a converged wireless network including a wide-area wireless network and a small-area wireless network.

FIG. 1 depicts a high-level block diagram of a converged wireless network including a wide-area wireless network and a small-area wireless network. Specifically, communication network 100 of FIG. 1 includes a dual-mode wireless device (DWD) 110, a radio access network (RAN) 120, a wireless local area network (WLAN) 130, a core circuit switching network (CCSN) 140, a core Internet Protocol network (CIPN) 150, a Public Switched Telephone Network (PSTN) 160, the Internet 170, and a billing system (BS) 180. As depicted in FIG. 1, communication network 100 is a converged wireless network enabling DWD 110 to communicate wirelessly over both a wide-area wireless network (illustratively, RAN 120 and CCSN 140) and a small-area wireless network (illustratively, WLAN 130 and CIPN 150). Although depicted as separate networks, those skilled in the art will appreciate that at least a portion of coverage areas of RAN 120 and WLAN 130 may overlap.

The DWD 110 is a converged mobile end-user device adapted to support communications over both a wide-area wireless network (illustratively, RAN 120 and associated CCSN 140 supporting cellular communications) and a small-area wireless network (illustratively, WLAN 130 and associated CIPN 150 supporting WiFi communications). The DWD 110 includes a wide-area wireless network transceiver supporting wide-area wireless communications (e.g., cellular-based wireless communications). As depicted in FIG. 1, DWD 110 communicates with CAP 122 of RAN 120 using a cellular wireless communication link 112. The DWD 110 includes a small-area wireless network transceiver supporting small-area wireless communications (e.g., WiFi-based wireless communications). As depicted in FIG. 1, DWD 110 communicates with WAP 132 of WLAN 130 using a WiFi wireless communication link 113.

The DWD 110 includes control circuitry, operating in conjunction with the wide-area and small-area wireless network transceivers, to select, at the time of connection establishment by DWD 110, either a first mode in which DWD 110 communicates with a wide-area wireless network or a second mode in which DWD 110 communicates with a small-area wireless network. The DWD 110 includes control circuitry operating in conjunction with the wide-area and small-area wireless network transceivers to switch DWD 110 between a first mode in which DWD 110 communicates with a wide-area wireless network and a second mode in which DWD 110 communicates with a small-area wireless network. The switch between modes may be user-initiated or automatic, e.g., in response to quality of service available from each wireless network (e.g., depending on the distance between DWD 110 and WAP 132).

The DWD 110 includes control circuitry operating in conjunction with the wide-area and small-area wireless network transceivers for detecting availability of both cellular wireless networks and WiFi wireless networks. If DWD 110 detects availability of both a cellular wireless network and a WiFi wireless network (during setup of a new connection or during an existing connection), DWD 110 may select either the cellular wireless network or the WiFi wireless network (i.e., switch modes) to support the connection. As DWD 110 moves with the end-user, DWD 110 may move in and out of WiFi hotspots. The DWD 110 is adapted for seamlessly switching between and cellular networks and WiFi wireless networks in a manner for maintaining an existing connection (i.e., DWD 110 includes control circuitry and associated programs supporting handoffs between cellular wireless networks and WiFi wireless networks).

In one embodiment, DWD 110 may be configured to automatically select the WiFi wireless network to support the connection, rather than selecting the cellular wireless network, as long as the WiFi wireless network is available (irrespective of quality of service associated with the WiFi wireless network). In this embodiment, if a WiFi wireless network is not detected, DWD 110 selects the available cellular wireless network to support the connection. In one embodiment, DWD 110 may be configured to select the WiFi wireless network to support the connection, rather than selecting the cellular wireless network, as long as the WiFi wireless network is available, and as long as quality of service available from the WiFi wireless network satisfies at least one quality of service requirement. In this embodiment, if a WiFi wireless is not available, or is available but cannot provide the required quality of service, DMD selects the available cellular wireless network to support the connection.

The RAN 120 may include any radio access network adapted for supporting cellular-based wireless communications. For example, RAN 120 may include a Second Generation (2G) wireless network (e.g. Time Division Multiple Access (TDMA), Code Division Multiple Access (CDMA), Global System for Mobile Communication (GSM), and the like), a 2G-Plus wireless network (e.g., General Packet Radio Service (GPRS), Enhanced Data for GSM Evolution (EDGE), and the like) a Third Generation (3G) wireless network (e.g., CDMA2000, Universal Mobile Telecommunications System (UMTS), and the like), Fourth Generation (4G) wireless networks (e.g., Multi-Carrier CDMA (MC-CDMA), Orthogonal Frequency Division Multiplexing (OFDM), and the like), and the like, as well as various combinations thereof. The RAN 120 may be referred to herein a wide-area wireless network due to the size of the coverage area supported by RAN 120.

The RAN 120 includes a cellular access point (CAP) 122. The CAP 120 may include equipment supporting cellular-based wireless communications from a mobile device (illustratively, MDM 110), such as transceivers, switches, and the like, as well as various combinations thereof. The implementation of CAP 122 is dependent upon the implementation of RAN 120. In one example, if RAN 120 is a CDMA network, CAP 120 may include a base transceiver station (BTS) and an associated base station (BS). In another example, if RAN 120 is UMTS network, CAP 122 may include a Node-B and an associated radio network controller (RNC). The RAN 120 interfaces with CCSN 140 using a communication path 124, which may traverse other networks, equipment, links, and the like (omitted for purposes of clarity).

The CCSN 140 includes a circuit-switching network adapted for supporting cellular-based wireless communications associated with RAN 120. The CCSN 140 may switch connections associated with RAN 120 between RAN 120 and PSTN 160 (e.g., for voice connections) using a communication path 144 between CCSN 140 and PSTN 160. The CCSN 140 may switch connections associated with RAN 120 between RAN 120 and CIPN 150 for providing various functions and services available from CIPN 150. The CCSN 140 may switch connections associated with RAN 120 between RAN 120 and CIPN 150 for providing additional functions and services available from the Internet 170 via CIPN 150 (e.g., for voice connections, data connections, and the like). The CCSN 140 interfaces with CIPN 150 using a communication path 145, which may traverse other networks, equipment, links, and the like (omitted for purposes of clarity).

The CCSN 140 includes a RAN gateway (RG) 142. The RG 142 operates as a gateway by which network traffic received from RAN 120 enters CCSN 140 and traffic transmitted toward RAN 120 exits CCSN 140. The implementation of RG 142 may be dependent upon the implementation of RAN 120. In one example, if RAN 120 is a CDMA network or UMTS network, RG 142 may include a mobile switching center (MSC). In another example, if RAN 120 is a GPRS network, RG 142 may include a Serving GPRS Support Node (SGSN). The CCSN 140 may include various other equipment, functions, and the like, as well as various combinations thereof (e.g., field monitoring equipment, relay stations, and the like). In one embodiment, RG 142 may include support for billing functions.

In one embodiment, billing functions supported by RG 142 may include collecting service usage information associated with cellular-based communications. The service usage information may include primary service usage information including information indicative of network resources consumed by a subscriber. The primary service usage information may include a number of minutes used by the subscriber (e.g., voice minutes for voice connections), an amount of bandwidth utilized by (or at least made available to) the subscriber (e.g., bandwidth for data connections), an amount of data (or network resources) used by the subscriber (e.g., data for a data connection), and the like, as well as various combinations thereof. The primary service usage information may further include information identifying other services accessed and utilized by the subscriber from RAN 120.

The service usage information may further include ancillary service usage information, associated with primary service usage information, which may be used in conjunction with primary service usage information to determine associated billing information. For example, ancillary service usage information may include start times associated with the start of voice/data calls/connections (e.g., for determining whether the minutes utilized by the subscriber apply to daytime minutes or night/weekend minutes, for determining whether peak data rates or off-peak data rates apply, and the like, as well as various combinations thereof). In one embodiment, collection of ancillary service usage information may depend on the service subscription plan associated with the subscriber (e.g., whether or not the service subscription plan provides night/weekend minutes, whether or not the service subscription plan provides peak versus off-peak data rates, and the like).

In one embodiment, the billing functions supported by RG 142 may include processing collected service usage information to generate corresponding billing information associated with cellular-based communications. In one embodiment, primary service usage information and ancillary service usage information may be processed together to generate associated billing information. The billing information may include charges associated with collected service usage information. For example, RG 142 may be adapted to translate the number of minutes of a voice call made by a subscriber into an associated charge for the call, translate the amount of data transferred over a data connection used by the subscriber into an associated charge for the data connection, and the like, as well as various combinations thereof.

The service usage information may be collected and maintained by RG 142 on one or more of a per-call/connection/flow basis, a per-subscriber basis, and the like. In one embodiment, RG 142 may periodically provide service usage information, billing information, and the like, as well as various combinations thereof, to BS 180. The RG 142 may initiate transfers of service usage information and/or billing information to BS 180 or, alternatively, BS 180 may request transfers of service usage information and/or billing information. The frequency with which RG 142 provides service usage information and/or billing information to BS 180 may be intra-daily, daily, weekly, monthly, and the like. The RG 142 may provide service usage information and/or billing information to BS 180 on one or more of a per-call/connection/flow basis, a per-subscriber basis, and the like.

The WLAN 130 may include any wireless local area network adapted for supporting IP-based wireless communications. The WLAN 130 may include a WLAN in accordance with one or more WLAN standards, such as Institute of Electrical & Electronics Engineers (IEEE) 802.11a/b/g WLAN standards, and the like, as well as other WLAN standards, as well as various combinations thereof. The WLAN 130 includes a WLAN access point (WAP) 132. The WAP 132 may include any device operable for interfacing with a mobile device (illustratively, DWD 110) for supporting IP-based wireless communications. For example, WAP 132 may include an access router operating in accordance with one or more WLAN standards, such as IEEE 802.11a/ b/g, and the like, as well as various combinations thereof. The WAP 132 may support wireless communications with DWD 110 and wired communications with other routers in WLAN 130 and WIPN 150.

The WLAN 130 may be referred to herein as a small-area wireless network due to the size of the region covered by WLAN 130. The region covered by one or several wireless access points (illustratively, WAP 132) is called a WiFi hotspot, which can range from a single room to square miles of overlapping WiFi hotspots. Although RAN 120 and WLAN 130 are depicted as being distinct, at least a portion of the wireless coverage areas associated with RAN 120 and WLAN 13, respectively, may be overlapping. For example, WiFi hotspots are typically located at enterprise campuses, educational campuses, public libraries, cafés, homes, and the like, as well as various combinations thereof (i.e., locations typically falling within the coverage area of a cellular wireless network, and potentially multiple coverage areas associated with respective multiple cellular wireless networks).

In one embodiment, in which WLAN 130 is located at an enterprise campus, WLAN 130 may be part of an enterprise IP network (omitted for purposes of clarity). An enterprise IP network may include both wired IP capabilities (e.g., wired routers supporting office computers, IP-PBXs supporting ISDN-based office phones, and the like) and wireless IP capabilities (e.g., one or more WLAN APs providing respective WiFi hotspots). The use of WiFi hotspots at enterprise campuses enables an employee with a dual-mode mobile phone to access services available from the enterprise IP network from anywhere on the enterprise campus (i.e., even away from his/her desk). For example, the dual-mode mobile phone may operate as an extension of the office phone (e.g., using a single phone number for the dual-mobile mobile phone and the office phone, simultaneously ringing both phones for incoming calls, using a single voice mailbox for both phones, and the like, as well as various combinations thereof). Various other benefits of implementing WiFi hotspots are known.

The CIPN 150 includes an IP-based network adapted for supporting IP-based wireless communications associated with WLAN 130. The CIPN 150 may support communications associated with WLAN 130 for providing various functions and services available from CIPN 150. The CIPN 150 interfaces with WLAN 130 using a communication path 135, which may traverse other networks, equipment, links, and the like (omitted for purposes of clarity). The CIPN 150 may switch communications associated with WLAN 130 to PSTN 160 (using a communication path 156 between CIPN 150 and PSTN 160) for providing various functions and services available from PSTN 160 (e.g., for voice connections) The CIPN 150 may switch communications associated with WLAN 130 to Internet 170 (using a communication path 157 between CIPN 150 and Internet 170) for providing various functions and services available from the Internet 170 (e.g., for voice connections, data connections, and the like).

As described herein, CIPN 150 may support communications associated with RAN 120 routed via CCSN 140 for providing various functions and services available from CIPN 150 (e.g., for voice connections, data connections, and the like). The CIPN may also support communications associated with RAN 120 by providing access to functions and services available from PSTN 160 (via communication path 156) and the Internet 170 (via communication path 157). The CIPN 150 interfaces with CCSN 140 using communication path 145, which may traverse other networks, equipment, links, and the like (omitted for purposes of clarity). The CIPN 150 may support various other communications for providing functions and services available from various other combinations of CIPN 150, PSTN 160, and the Internet 170, as well as other networks (not depicted).

The CIPN 150 includes a WLAN gateway (WG) 152. The WG 152 operates as a gateway by which network traffic received from WLAN 130 enters CIPN 150 and traffic transmitted toward WLAN 130 exits CIPN 150. The implementation of WG 152 may be dependent upon the implementation of WLAN 130. The CIPN 150 further includes a multi-service gateway (MGW) 154. The MGW 154 operates as a gateway by which network traffic received from CCSN 140 enters CIPN 150 and traffic transmitted toward CCSN 140 exits CIPN 150. The CIPN 150 may include various other equipment, functions, and the like, as well as various combinations thereof (e.g., field monitoring equipment, relay stations, and the like). In one embodiment, WG 152 and, optionally, MGW 154, may include support for billing functions.

In one embodiment, billing functions supported by WG 152 may include collecting service usage information associated with WiFi-based communications. The service usage information may include primary service usage information including information indicative of network resources consumed by a subscriber. The primary service usage information may include a number of minutes used by the subscriber (e.g., voice minutes for voice connections), an amount of bandwidth utilized by (or at least made available to) the subscriber (e.g., bandwidth for data connections), an amount of data (or network resources) used by the subscriber (e.g., data for a data connection), and the like, as well as various combinations thereof. The primary service usage information may further include information identifying other services accessed and utilized by the subscriber from WLAN 130.

The service usage information may further include ancillary service usage information, associated with the primary service usage information, which may be used in conjunction with primary service usage information to determine associated billing information. For example, ancillary service usage information may include start times associated with the start of voice/data calls/connections (e.g., for determining whether the minutes utilized by the subscriber apply to daytime minutes or night/weekend minutes, for determining whether peak data rates or off-peak data rates apply, and the like, as well as various combinations thereof). In one embodiment, collection of ancillary service usage information may depend on the service subscription plan associated with the subscriber (e.g., whether or not the service subscription plan provides night/weekend minutes, whether or not the service subscription plan provides peak versus off-peak data rates, and the like).

In one embodiment, the billing functions supported by WG 152 may include processing collected service usage information to generate corresponding billing information associated with WiFi-based communications. In one embodiment, primary service usage information and ancillary service usage information may be processed together to generate associated billing information. The billing information may include charges associated with collected service usage information. For example, WG 152 may be adapted to translate the number of minutes of a voice call made by a subscriber into an associated charge for the call, translate the amount of data transferred over a data connection used by the subscriber into an associated charge for the data connection, and the like, as well as various combinations thereof.

The service usage information may be collected and maintained by WG 152 on one or more of a per-call/connection/flow basis, a per-subscriber basis, and the like. In one embodiment, WG 152 may periodically provide service usage information, billing information, and the like, as well as various combinations thereof, to BS 180. The WG 152 may initiate transfers of service usage information and/or billing information to BS 180 or, alternatively, BS 180 may request transfers of service usage information and/or billing information. The frequency with which WG 152 provides service usage information and/or billing information to BS 180 may be intra-daily, daily, weekly, monthly, and the like. The WG 152 may provide service usage information and/or billing information to BS 180 on one or more of a per-call/connection/flow basis, a per-subscriber basis, and the like.

The BS 180 is adapted for computing bills for wireless service subscribers (generally referred to herein as subscribers). The BS 180 may obtain, for each wireless subscriber, service subscription information. The service subscription information may include personal information associated with the subscriber, such as name, address, account number, wireless phone number (e.g., 555-867-5309), and the like, as well as various combinations thereof. The service subscription information may include details about the wireless service subscription (which may also be referred to as a wireless plan). The service subscription information associated with a subscriber may vary depending on the wireless services available to the subscriber (e.g., wireless service subscription information may vary for wireless voice services, wireless data services, other wireless services, and the like, as well as various combinations thereof).

In one embodiment, in which a wireless service subscription includes wireless voice service, service subscription information may include, for example, a number of peak minutes included in the wireless plan (e.g., 600 peak minutes per month), a number of off-peak minutes included in the wireless plan (e.g., 3000 night and weekend minutes per month), a charge rate for each peak and non-peak minute in excess of the allotted peak minutes and non-peak minutes included in the wireless plan (e.g., forty cents per minute for each additional peak minute and ten cents per minutes for each additional non-peak minute, respectively), and the like, as well as various combinations thereof.

In one embodiment, in which a wireless service subscription includes wireless data service, service subscription information may include, for example, a data rate at which the subscriber is charged for receiving and transmitting data, a bandwidth rate at which the subscriber is charged for bandwidth made available to or consumed by the subscriber, and the like, as well as various combinations thereof. In such embodiments, as well as other embodiments, service subscription information may include various credits available to the subscriber, rates and/or flat fees the subscriber will be charged for different services available to the subscriber and/or used by the subscriber, and the like, as well as various combinations thereof.

Although described with respect to relatively simply examples, BS 180 may obtain any service subscription information which may be used to compute a bill for the associated subscriber to the wireless service subscription. In one embodiment, at least a portion of the service subscription information may be obtained by BS 180 locally (e.g., from the memory of BS 180). In one embodiment, at least a portion of the service subscription information may be obtained by BS 180 from one or more remote databases (illustratively, BRD 182). The service subscription information, or at least portions thereof, may be obtained from other systems (e.g. subscriber management systems, service management systems, and the like) in communication with BS 180 (omitted for purposes of clarity).

The BS 180 obtains service usage information and, optionally, billing information, associated with cellular-based communications from the cellular portion of the network (e.g., from one or more service usage information collection systems in CCSN 140 and/or RAN 120). For example, BS 180 may obtain service usage information and associated billing information associated with cellular-based communications from CAP 142 via a communication path 184 between BS 180 and CCSN 140. The BS 180 obtains service usage information and, optionally, billing information, associated with WiFi-based communications from the WiFi portion of the network (e.g., from one or more service usage information collection systems in CIPN 150 and/or WLAN 130). For example, BS 180 may obtain service usage information and associated billing information associated with WiFi-based communications from WAP 152 via a communication path 185 between BS 180 and WIPN 150.

The BS 180 computes a bill for each wireless service subscriber. A bill may be computed by processing obtained service subscription information, service usage information (which may optionally include associated billing information), one or more bill computing parameters (including bill adjustment parameters adapted for adjusting a bill according to service usage information for wireless service provided using a small-area wireless network), and the like, as well as various combinations thereof. A bill may be computed for any time period; however, a monthly bill is most common. A computed bill may include unprocessed (i.e., raw) and/or processed combinations of service subscription information, service usage information, and the like, as well as various combinations thereof (which, in the context of computing a bill, may be collectively referred to as billing information).

For a wireless service provider, the cost structure for transporting subscriber traffic over cellular-based wireless networks (e.g., 3 cents per minute) is greater than the cost structure for transporting subscriber traffic over WiFi-based wireless networks (e.g., 1.5 cents per minute). Based on this difference in cost structures, wireless service providers can increase profits by simply transporting traffic over WiFi-based wireless networks rather than cellular-based wireless networks (i.e., using a converged wireless network to transport traffic typically transported over cellular-based wireless networks over WiFi-based wireless networks).

Since transport of traffic over WiFi-based wireless networks, rather than cellular-based wireless networks, provides significant savings for wireless service providers, wireless service providers may want to entice subscribers to switch to dual-mode wireless devices, thereby enabling subscribers to communicate wirelessly using WiFi-based wireless networks. Furthermore, wireless service providers may want to entice subscribers with dual-mode wireless devices to maximize use of WiFi-based wireless networks. One way in which wireless service providers may entice subscribers to switch to converged wireless networks and, further, to maximize use of WiFi-based wireless networks, is to return to the subscriber a portion of the savings realized by the service provider when the subscriber communicates using a WiFi-based wireless network instead of a cellular-based wireless network.

Furthermore, the billing functions of the present invention advantageously obviate the need for a subscriber to keep track of two sets of credits (i.e., a first set of credits for cellular-based communications associated with the subscriber and a second set of credits for WiFi-based communications associated with the subscriber) for a wireless service subscription purchased by the subscriber from a wireless service provider. The billing functions of the present invention (depicted and described herein with respect to BS 180 (as well as associated service usage tracking systems CG 142 and WG 152)) may be better understood with respect to FIG. 2 and FIG. 3.

Figure 2:
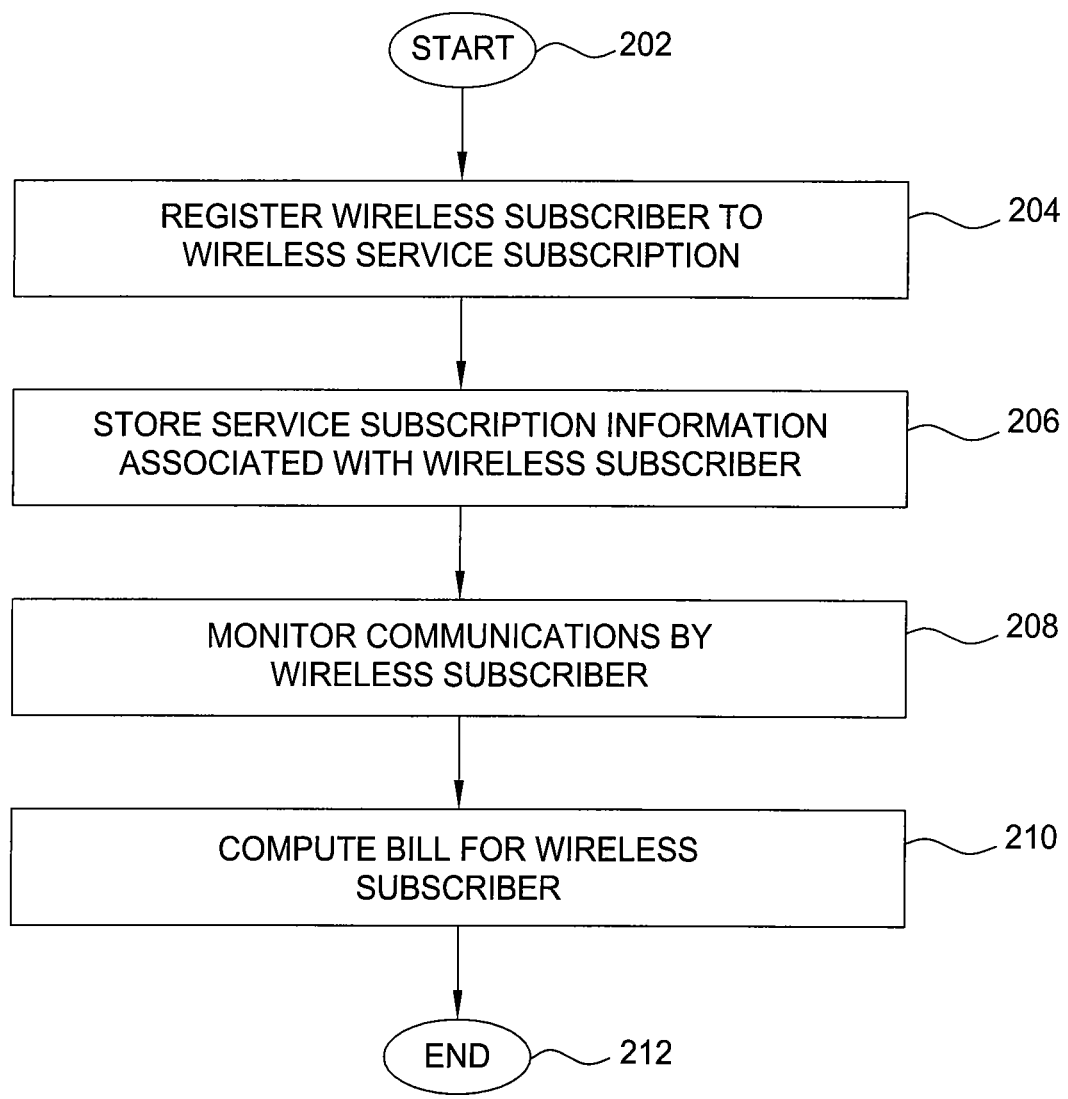
FIG. 2 depicts a method according to one embodiment of the present invention.

FIG. 2 depicts a method according to one embodiment of the present invention. Specifically, method 200 includes a method for registering a wireless subscriber to a wireless service subscription including one set of credits, where each of the credits is applicable to communications by the wireless subscriber using a wide-area wireless network and communications by the wireless subscriber using a small-area wireless network. Although depicted and described as being performed serially, at least a portion of the steps of method 200 may be performed contemporaneously, or in a different order depicted in FIG. 2. The method 200 begins at step 202 and proceeds to step 204.

At step 204, a wireless subscriber is registered to a wireless service subscription. The registration of the wireless subscriber to the wireless service subscription may involve collection of personal information about the wireless subscriber, such as name, address, wireless service subscription selected, and the like, as well as various combinations thereof. At step 206, service subscription information associated with the wireless subscriber is stored. The service subscription information may include personal information such as name, address, account number, wireless phone number, and the like, as well as various combinations thereof. The service subscription information may include details about the wireless service subscription (e.g., allotted number of peak/non-peak voice minutes per month, billing rate for peak/non-peak in excess of allotted minutes, service charges, and the like, as well as various other charges associated with other non-voice services, as well as various combinations thereof.

At step 208, communication by the wireless subscriber (i.e., service usage of the wireless subscriber) is monitored. The communications by the wireless subscriber may be monitored using network elements adapted for monitoring communications (illustratively, for example, MCS 142 for wide-area wireless networks such as RAN 120 and WG 152 for small-area wireless networks such as WLAN 130). The communications by the wireless subscriber may be monitored in order to collect associated service usage information adapted for computing a bill for the wireless subscriber. At step 210, a bill is computed for the wireless subscriber. At step 212, method 200 ends. The monitoring of communications and collection of associated service usage information for a wireless subscriber, as well as computing an associated bill for the wireless subscriber, may be better understood with respect to FIG. 3.

Figure 3:
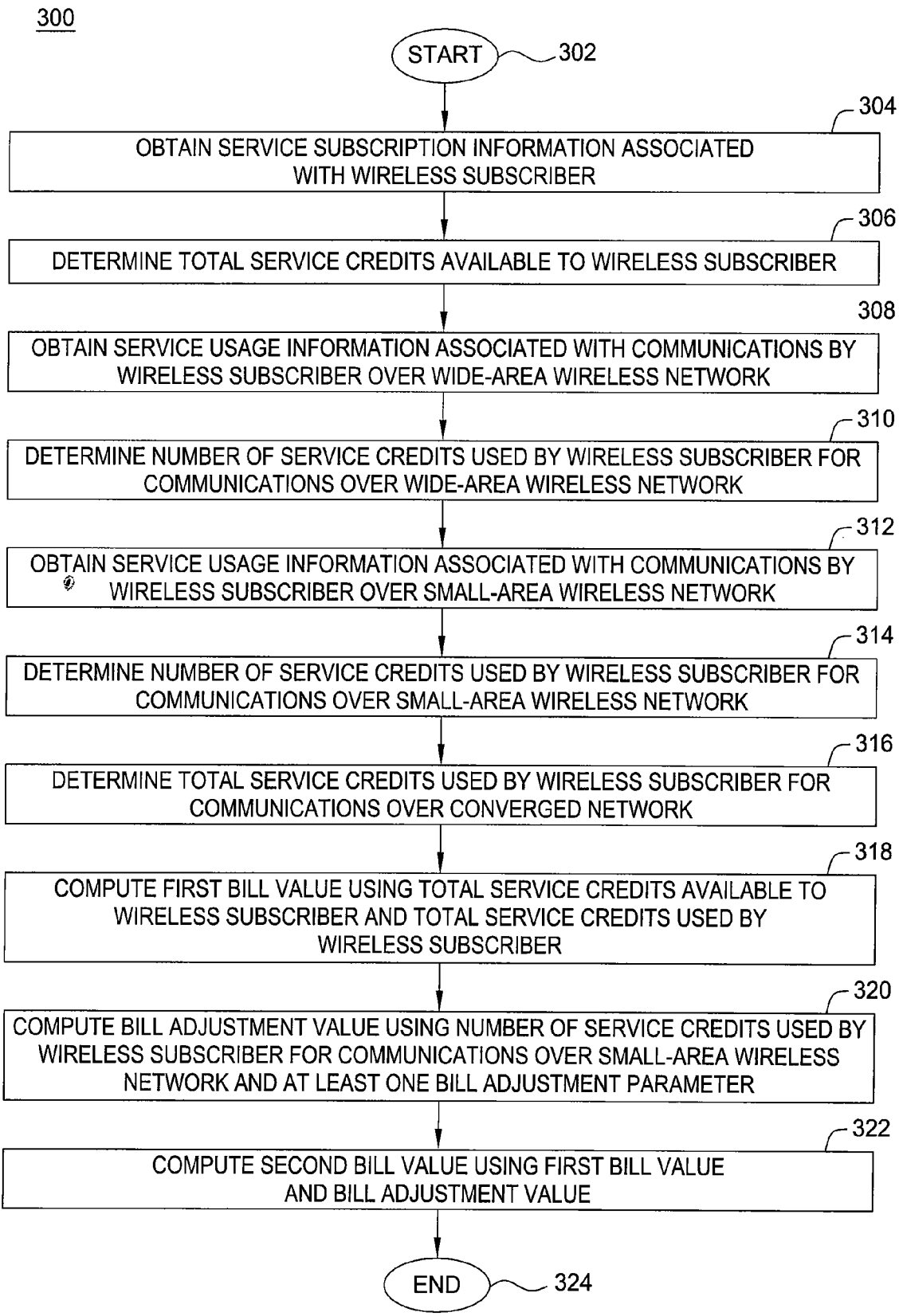
FIG. 3 depicts a method according to one embodiment of the present invention.

FIG. 3 depicts a method according to one embodiment of the present invention. Specifically, method 300 includes a method for computing, for a wireless service subscriber, a bill for wireless service provided using a converged wireless network supporting cellular-based wireless communications and WiFi-based wireless communications. Although primarily described herein with respect to cellular-based and WiFi-based communication, method 300 may be used to compute a bill for a converged wireless network supporting any wide-area wireless communications and any small-area wireless communications. Although depicted and described as being performed serially, at least a portion of the steps of method 300 may be performed contemporaneously, or in a different order depicted in FIG. 3. The method 300 begins at step 302 and proceeds to step 304.

At step 304, service subscription information associated with the wireless service subscriber is obtained. The service subscription information may be obtained from a wireless service subscription associated with the wireless subscriber. At step 306, the total number of service credits available to the wireless subscriber is determined. The total number of service credits available to the wireless subscriber may be determined from the service subscription information.

At step 308, service usage information associated with communications by the wireless subscriber over the wide-area wireless network is obtained. In one embodiment, the wide-area wireless network includes a cellular network (e.g., CDMA, UMTS, and the like). At step 310, the number of service credits used by the wireless subscriber for communications over the wide-area wireless network is determined. The number of service credits used by the wireless subscriber for communications over the wide-area wireless network may be determined using the service usage information associated with communications by the wireless subscriber over the wide-area wireless network.

At step 312, service usage information associated with communications by the wireless subscriber over the small-area wireless network is obtained. At step 314, the number of service credits used by the wireless subscriber for communications over the small-area wireless network is determined. In one embodiment, the small-area wireless network includes a WiFi network (e.g., IEEE 802.11a, 802.11b, 802.11g, and the like). The number of service credits used by the wireless subscriber for communications over the small-area wireless network may be determined using the service usage information associated with communications by the wireless subscriber over the small-area wireless network.

At step 316, the total number of service credits used by the wireless subscriber for communications over the converged wireless network is determined. The total number of service credits used by the wireless subscriber for communications over the converged wireless network may be determined as a sum of the number of service credits used by the wireless subscriber for communications over the wide-area wireless network and the number of service credits used by the wireless subscriber for communications over the small-area wireless network.

At step 318, a first bill value is computed. The first bill value is computed using the service subscription information, the service usage information associated with communications by the wireless subscriber over the wide-area network, and service usage information associated with communications by the wireless subscriber over the small-area network. The service subscription information may include a total number of service credits available to the wireless subscriber, a billing charge for available service credits included within the service subscription, one or more billing rate for additional service credits used by the wireless subscriber, and the like, as well as various combinations thereof. The first bill value is computed using the total service credits available to the wireless subscriber and the total service credits used by the wireless subscriber.

At step 320, a bill adjustment value is computed. The bill adjustment value is computed using the number of service credits used by the wireless subscriber for communications over the small-area wireless network and at least one bill adjustment parameter. In one embodiment, the bill adjustment value may be used as a billing credit (e.g., refund)

provided by the wireless service provider to the wireless subscriber to reward the wireless subscriber for communicating, at least a part of the time, over the small-area wireless network rather than the wide-area wireless network. At step 322, a second bill value is computed. The second bill value is computed using the first bill value and the bill adjustment value. The second bill value may be alternatively referred to as a modified version of the first bill value (i.e., modifying the first bill value using the bill adjustment value). At step 324, method 300 ends.

Using the present invention, wireless service subscribers still purchase service credits (e.g., minutes for voice service, bandwidth for data service, and the like, as well as various combinations thereof) in the familiar wireless service subscription plan format. For example, a subscriber may sign up for a service subscription plan including 600 peak minutes and unlimited off-peak minutes (i.e., night and weekend minutes) (i.e., total service credits available to wireless subscriber) for $50 per month. The wireless service provider then monitors service usage of the subscriber. The wireless service provider keeps track of service usage for voice traffic (and, optionally, other traffic and services) which traverses wide-area wireless networks and service usage for voice traffic (and, optionally, other traffic and services) which traverses small-area wireless networks.

For example, using service usage monitoring functions, the wireless service provider may determine that the subscriber used 700 voice minutes (200 peak minutes and 500 off-peak minutes) during which voice traffic traversed a cellular wireless network and 896 voice minutes (396 peak minutes and 500 off-peak minutes) during which voice traffic traversed a WiFi wireless network. Since off-peak minutes are not charged, in this example, the 596 peak voice minutes may be considered the total service credits used by the wireless subscriber. Since the total number of peak voice minutes used by the subscriber during the month, which is computed as the combination of the peak cellular voice minutes and peak WiFi voice minutes (i.e., 200+395=595), is less than the 600 peak minutes included in the service subscription plan, the initial bill for the subscriber is computed to be $50 (i.e., the monthly cost of the service subscription plan).

In another example, if the total number of voice minutes used by the subscriber during the month is computed to be greater than the anytime minutes included in the associated service subscription plan, each such additional minute may be charged at one or more rates depending on day of week, time of day, and the like, as well as various combinations thereof, thereby resulting in an additional charge to the subscriber. In this example, the initial bill for the subscriber may be computed as a summation of the monthly subscription fee and the additional charges to the subscriber resulting from additional minutes use by the subscriber. In still another example, the initial bill for the subscriber may be computed by summing all charges associated with voice service usage, as well as any other service charges resulting from services used by the subscriber (e.g., charges for data services, voicemail, call forwarding, and the like, as well as various combinations thereof).

The initial bill for the subscriber is then modified, based on service usage associated with voice traffic which traversed the WiFi wireless network, to generate a modified bill for the subscriber. The initial bill for the subscriber may be modified based on at least one adjustment parameter. For example, assuming, according to the example described herein, that transport of voice traffic over a WiFi wireless network saves the wireless service provider 1.5 cents per voice minute, the wireless service provider may refund a portion of that savings to the subscriber. In this example, the adjustment parameter may include a billing credit rate of 0.5 cents per WiFi-based voice minute (including peak WiFi voice minutes and, optionally, also off-peak WiFi voice minutes). In this example, a bill adjustment value is determined by multiplying the number of voice minutes during which voice traffic traversed the WiFi wireless network (i.e., 396+500=896 WiFi-based voice minutes) by the billing credit rate (i.e., 0.5 cents per WiFi-based voice minute), thereby resulting in a bill adjustment value of $4.48. The modified bill is then computed as a difference between the initial bill and the bill adjustment value (i.e., $50-$4.48=$45.52), resulting in a total bill of $45.52 owed by the subscriber to the wireless service provider.

Figure 4:
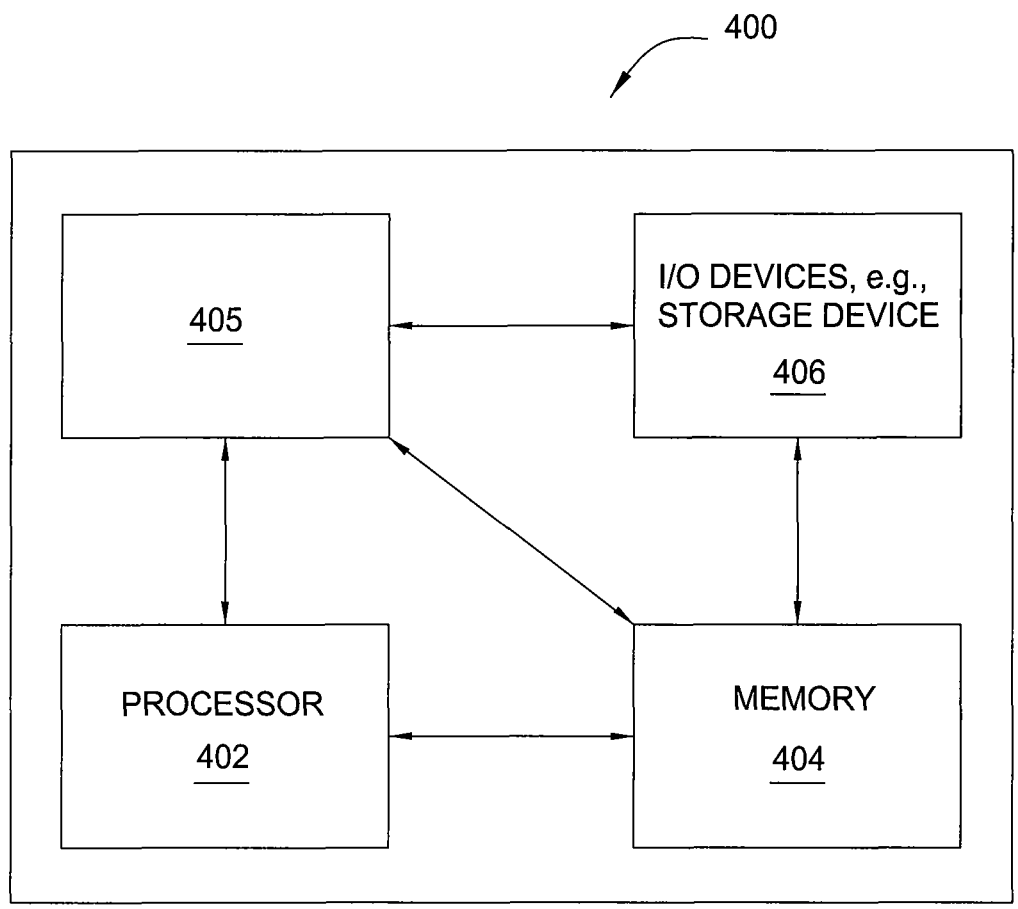
FIG. 4 depicts a high-level block diagram of a general-purpose computer suitable for use in performing at least a portion of the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a wireless service billing module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in a combination of software and hardware, e.g., using application specific integrated circuits (ASIC), a general purpose computer or any other hardware equivalents. In one embodiment, the present wireless service billing module or process 405 can be loaded into memory 404 and executed by processor 402 to implement the functions as discussed above. As such, wireless service billing process 405 (including associated data structures) of the present invention can be stored on a computer readable medium e.g., RAM memory, magnetic or optical drive or diskette and the like Although various embodiments which incorporate the teachings of the present invention have been shown and described in detail herein, those skilled in the art can readily devise many other varied embodiments that still incorporate these teachings.

What is claimed is:

1. A method for determining a bill for a wireless subscriber communicating using a converged wireless network, the method comprising:

obtaining, by a billing system associated with the converged wireless network, a number of available service credits for the wireless subscriber;

obtaining, by the billing system, wide-area service usage information for communications by the wireless subscriber using a wide-area wireless network;

obtaining, by the billing system, small-area service usage information for communications by the wireless subscriber using a small-area wireless network;

determining, by the billing system using the wide-area service usage information and the small-area service usage information, a number of used service credits used by the wireless subscriber;

determining, by the billing system using the number of available service credits for the wireless subscriber and the number of used service credits used by the wireless subscriber, a bill value for the wireless subscriber;

determining, by the billing system using the small-area service usage information and a bill adjustment parameter configured to be controlled by a wireless service provider of the wide-area wireless network, a bill adjustment value for the wireless subscriber; and adjusting, by the billing system using the bill adjustment value for the wireless subscriber, the bill value for the wireless subscriber to provide thereby an adjusted bill value for the wireless subscriber.

2. The method of claim 1, wherein
the number of available service credits for the wireless subscriber comprises a number of voice minutes available for the wireless subscriber and the number of used service credits used by the wireless subscriber comprises a number of voice minutes used by the wireless subscriber.

3. The method of claim 1, wherein determining the number of used service credits used by the wireless subscriber comprises:

determining, by the billing system using the wide-area service usage information, a number of service credits used by the wireless subscriber for the communications using the wide-area wireless network;

determining, by the billing system using the small-area service usage information, a number of service credits used by the wireless subscriber for communications using the small-area wireless network; and determining the number of used service credits used by the wireless subscriber by summing the number of service credits used by the wireless subscriber for communications using the wide-area wireless network and the number of service credits used by the wireless subscriber for communications using the small-area wireless network.

4. The method of claim 1, wherein
the bill value is determined using ancillary service usage information associated with at least one of the wide-area service usage information and the small-area service usage information.

5. The method of claim 1, wherein the bill adjustment parameter comprises one of a fixed adjustment factor and a variable adjustment factor.

6. The method of claim 1, wherein the bill adjustment value comprises a refund to the wireless subscriber.

7. The method of claim 1, wherein the wide-area wireless network comprises a cellular wireless network and the small-area wireless network comprises a WiFi network.

8. An apparatus for determining a bill for a wireless subscriber communicating using a converged wireless network, comprising:

a processor and a memory communicatively connected to the processor, the processor configured to:

obtain, by a billing system associated with the converged wireless network, a number of available service credits for the wireless subscriber;

obtain, by the billing system, wide-area service usage information for communications by the wireless subscriber using a wide-area wireless network;

obtain, by the billing system, small-area service usage information for communications by the wireless subscriber using a small-area wireless network;

determine, by the billing system using the wide-area service usage information and the small-area service usage information, a number of used service credits used by the wireless subscriber;

number of available service credits for the wireless subscriber and the number of used service credits used by the wireless subscriber, a bill value for the wireless subscriber;

determine, by the billing system using the small-area service usage information and a bill adjustment parameter configured to be controlled by a wireless service provider of the wide-area wireless network, a bill adjustment value for the wireless subscriber; and adjust, by the billing system using the bill adjustment value for the wireless subscriber, the bill value for the wireless subscriber to provide thereby an adjusted bill value for the wireless subscriber.

9. The apparatus of claim 8, wherein
the number of available service credits for the wireless subscriber comprises a number of voice minutes available for the wireless subscriber and the number of used service credits used by the wireless subscriber comprises a number of voice minutes used by the wireless subscriber.

10. The apparatus of claim 8, wherein, to determine the number of used service credits used by the wireless subscriber, the processor is configured to:

determine, by the billing system using the wide-area service usage information, a number of service credits used by the wireless subscriber for the communications using the wide-area wireless network;

determine, by the billing system using the small-area service usage information, a number of service credits used by the wireless subscriber for communications using the small-area wireless network; and determine the number of used service credits used by the wireless subscriber by summing the number of service credits used by the wireless subscriber for communications using the wide-area wireless network and the number of service credits used by the wireless subscriber for communications using the small-area wireless network.

11. The apparatus of claim 8, wherein the processor is configured to:

determine the bill value using ancillary service usage information associated with at least one of the wide-area service usage information and the small-area service usage information.

12. The apparatus of claim 8, wherein the bill adjustment parameter comprises one of a fixed adjustment factor and a variable adjustment factor.

13. The apparatus of claim 8, wherein the bill adjustment value comprises a refund to the wireless subscriber.

14. The apparatus of claim 8, wherein the wide-area wireless network comprises a cellular wireless network and the small-area wireless network comprises a WiFi network.

15. A non-transitory computer-readable storage medium storing a software program, that, when executed by a computer, causes the computer to perform a method, the method comprising:

obtaining, by a billing system associated with the converged wireless network, a number of available service credits for the wireless subscriber;

obtaining, by the billing system, wide-area service usage information for communications by the wireless subscriber using a wide-area wireless network;

obtaining, by the billing system, small-area service usage information for communications by the wireless subscriber using a small-area wireless network;

determining, by the billing system using the wide-area service usage information and the small-area service usage information, a number of used service credits used by the wireless subscriber;

determining, by the billing system using the number of available service credits for the wireless subscriber and the number of used service credits used by the wireless subscriber, a bill value for the wireless subscriber;

determining, by the billing system using the small-area service usage information and a bill adjustment parameter configured to be controlled by a wireless service provider of the wide-area wireless network, a bill adjustment value for the wireless subscriber; and adjusting, by the billing system using the bill adjustment value for the wireless subscriber, the bill value for the wireless subscriber to provide thereby an adjusted bill value for the wireless subscriber.

16. A system, comprising:

a wide-area wireless network;

a small-area wireless network;

a wireless terminal adapted for communicating using the wide-area wireless network and the small-area wireless network, wherein the wireless terminal is adapted to prefer communicating using the small-area wireless network; and a billing system in communication with the wide-area wireless network and the small-area wireless network, the billing system configured to determine a bill for a wireless subscriber communicating using the wireless terminal by:

obtaining, by the billing system, a number of available service credits for the wireless subscriber;

obtaining, by the billing system, wide-area service usage information for communications by the wireless subscriber using a wide-area wireless network;

obtaining, by the billing system, small-area service usage information for communications by the wireless subscriber using a small-area wireless network;

determining, by the billing system using the wide-area service usage information and the small-area service usage information, a number of used service credits used by the wireless subscriber;

determining, by the billing system using the number of available service credits for the wireless subscriber and the number of used service credits used by the wireless subscriber, a bill value for the wireless subscriber;

determining, by the billing system using the small-area service usage information and a bill adjustment parameter configured to be controlled by a wireless service provider of the wide-area wireless network, a bill adjustment value for the wireless subscriber; and adjusting, by the billing system using the bill adjustment value for the wireless subscriber, the bill value for the wireless subscriber to provide thereby an adjusted bill value for the wireless subscriber.

17. An apparatus for determining a bill for a wireless subscriber communicating using a converged wireless network, the apparatus comprising:

a processor and a memory communicatively connected to the processor, the processor configured to:

obtaining, by a billing system, wide-area service usage information for communications by the wireless subscriber using a wide-area wireless network;

obtaining, by the billing system, small-area service usage information for communications by the wireless subscriber using a small-area wireless network;

determining, by the billing system using the wide-area service usage information and the wide-area service usage information, a bill value for the wireless subscriber;

determining, by the billing system using the small-area service usage information and a bill adjustment parameter configured to be controlled by a wireless service provider of the wide-area wireless network, a bill adjustment value for the wireless subscriber; and adjusting, by the billing system using the bill adjustment value for the wireless subscriber, the bill value for the wireless subscriber to provide thereby an adjusted bill value for the wireless subscriber.

* * * * *